(12) United States Patent
Hong et al.

(10) Patent No.: US 11,720,438 B2
(45) Date of Patent: Aug. 8, 2023

(54) RECORDING AND DECODING OF INFORMATION RELATED TO MEMORY ERRORS IDENTIFIED BY MICROPROCESSORS

(71) Applicant: Micron Technology, Inc., Boise, ID (US)

(72) Inventors: Da Hong, Zhejian (CN); Kexian Huang, Shenzhen (CN); Qing Xu, Shenzhen (CN)

(73) Assignee: Micron Technology, Inc., Boise, ID (US)

( * ) Notice: Subject to any disclaimer, the term of this patent is extended or adjusted under 35 U.S.C. 154(b) by 0 days.

(21) Appl. No.: 17/245,761

(22) Filed: Apr. 30, 2021

(65) Prior Publication Data

US 2022/0318087 A1 Oct. 6, 2022

Related U.S. Application Data

(63) Continuation of application No. PCT/CN2021/085003, filed on Apr. 1, 2021.

(51) Int. Cl.
*G06F 11/00* (2006.01)
*G06F 11/07* (2006.01)
(Continued)

(52) U.S. Cl.
CPC ...... *G06F 11/0793* (2013.01); *G06F 11/0772* (2013.01); *G06F 11/1407* (2013.01); *G06F 11/3079* (2013.01)

(58) Field of Classification Search
CPC ............. G06F 11/0793; G06F 11/0772; G06F 11/1407; G06F 11/3079; G06F 11/0766;
(Continued)

(56) References Cited

U.S. PATENT DOCUMENTS 7,546,487 B2 * 6/2009 Marisetty ............ G06F 11/0706
714/10
8,468,422 B2 * 6/2013 Chessin .............. G06F 11/1044
714/763
(Continued)

FOREIGN PATENT DOCUMENTS

CN 103198000 7/2013
CN 111984487 11/2020
(Continued)

OTHER PUBLICATIONS

X. Du, C. Li, S. Zhou, M. Ye and J. Li, "Predicting Uncorrectable Memory Errors for Proactive Replacement: An Empirical Study on Large-Scale Field Data," 2020 16th European Dependable Computing Conference (EDCC), Munich, Germany, 2020, pp. 41-46 (Year: 2020).*

(Continued)

*Primary Examiner* — Anthony J Amoroso
(74) *Attorney, Agent, or Firm* — Greenberg Traurig (57) ABSTRACT

A system, method and apparatus to record data relevant to hardware errors identified by microprocessors. For example, in response to a hardware error, a microprocessor can store first data about the error in registers in the microprocessor and start to execute instructions configured in firmware and/or in an operating system. Execution of the instructions in response to the hardware error causes the microprocessor to: generating second data about the error based at least in part on the first data in the registers; and store the second data at a location not affected by restarting execution of an operating system in the processor. For example, the execution of the instructions can cause the microprocessor to decode the first data to obtain a temperature of the computing device as part of the second data.

19 Claims, 5 Drawing Sheets

(51) Int. Cl.
  *G06F 11/30* (2006.01)
  *G06F 11/14* (2006.01)
(58) Field of Classification Search
  CPC ............. G06F 11/0778; G06F 11/0784; G06F 11/0787; G06F 11/1402; G06F 11/1405; G06F 11/141; G06F 11/3065
  See application file for complete search history.

(56) References Cited

U.S. PATENT DOCUMENTS

| | | | |
|---|---|---|---|
| 9,535,774 B2* | 1/2017 | Cher | G06F 11/3058 |
| 9,954,727 B2* | 4/2018 | Su | H04L 41/0686 |
| 10,152,393 B2* | 12/2018 | Kelly | G06F 11/1441 |
| 10,713,109 B2* | 7/2020 | Tarlano | G06F 9/542 |
| 2007/0162786 A1 | 7/2007 | Shuma | |
| 2009/0070630 A1* | 3/2009 | Khatri | G06F 11/1008 |
| | | | 714/E11.002 |
| 2011/0239088 A1 | 9/2011 | Post | |
| 2012/0239973 A1 | 9/2012 | Walton et al. | |
| 2014/0245106 A1 | 8/2014 | Leininger et al. | |
| 2014/0351673 A1 | 11/2014 | Ware et al. | |
| 2015/0006962 A1* | 1/2015 | Swanson | G06F 11/0724 |
| | | | 714/38.11 |
| 2016/0055052 A1 | 2/2016 | Hu et al. | |
| 2016/0055059 A1 | 2/2016 | Hu et al. | |
| 2018/0032399 A1 | 2/2018 | Johnson et al. | |
| 2021/0255939 A1* | 8/2021 | Chaiken | G06F 11/0757 |
| 2021/0263868 A1* | 8/2021 | Maddukuri | G06F 11/0793 |

FOREIGN PATENT DOCUMENTS

| | | | | |
|---|---|---|---|---|
| TW | I620061 B | * | 1/2019 | ............. G06F 11/28 |
| WO | 2022066178 | | 3/2022 | |

OTHER PUBLICATIONS

A. Gainaru, F. Cappello, M. Snir and W. Kramer, "Fault prediction under the microscope: A closer look into HPC systems," SC '12: Proceedings of the International Conference on High Performance Computing, Networking, Storage and Analysis, Salt Lake City, UT, USA, 2012, pp. 1-11 (Year: 2012).*

L. Mukhanov, K. Tovletoglou, H. Vandierendonck, D. S. Nikolopoulos and G. Karakonstantis, "Workload-Aware DRAM Error Prediction using Machine Learning," 2019 IEEE International Symposium on Workload Characterization (IISWC), Orlando, FL, USA, 2019, pp. 106-118 (Year: 2019).*

International Search Report and Written Opinion, PCT/CN2021/085003, dated Jan. 6, 2022.

* cited by examiner

RECORDING AND DECODING OF INFORMATION RELATED TO MEMORY ERRORS IDENTIFIED BY MICROPROCESSORS

RELATED APPLICATIONS

The present application is a continuation application of International Pat. App. Ser. No. PCT/CN2021/085003, filed Apr. 1, 2021 and entitled "Recording and Decoding of Information Related to Memory Errors Identified by Microprocessors", the entire disclosure of which application is hereby incorporated herein by reference.

TECHNICAL FIELD

At least some embodiments disclosed herein relate to error processing in computer systems in general, and more particularly, but not limited to recording data relevant to errors in a memory system accessed by microprocessors in execution of instructions.

BACKGROUND

Some microprocessors are configured with a mechanism, such as Machine Check Architecture (MCA), to report hardware errors to the operating system. Further, the microprocessors can have a System Management Mode (SMM) in which execution of the operating system and applications is suspended to run a set of instructions that are typically configured in the firmware of a computer system, such as the Basic Input/Output System (BIOS) of the computer system.

For example, in response to a hardware error in a server computer, a microprocessor of the server computer can store error data in MCA registers and enter the System Management Mode (SMM) to run a registered routine of the BIOS of the server computer. The registered routine of BIOS can be configured to retrieve the error data from the MCA registers of the microprocessor for use by the operating system of the computer system. The BIOS can pass the error data retrieved from the MCA registers to the operating system. Alternatively, the operating system may read the MCA registers directly, after the microprocessor returns from the System Management Mode (SMM) to the normal mode. The operating system can then store the error data into a storage device (e.g., a hard drive disk) to facilitate error analysis, diagnosis, etc.

Intelligent Platform Management Interface (IPMI) is a set of computer interface specifications. An autonomous computer subsystem can use IPMI to manage and monitor a host computer system independently of the microprocessor of the host computer system. For example, a server computer can have a Baseboard Management Controller (BMC) configured on the motherboard of the server computer to implement IPMI.

For example, in response to a hardware error in the server computer, a Baseboard Management Controller (BMC) configured on the motherboard of the server computer can monitor the error events in the microprocessor of the server computer, retrieve the error data from the MCA registers in response to a hardware error, and store the error data from MCA registers into a storage area of the Baseboard Management Controller (BMC) for subsequent error analysis, diagnosis, etc.

BRIEF DESCRIPTION OF THE DRAWINGS

The embodiments are illustrated by way of example and not limitation in the figures of the accompanying drawings in which like references indicate similar elements.

DETAILED DESCRIPTION

At least some aspects of the present disclosure are directed to recording data relevant to errors in a memory system accessed by microprocessors in execution of instructions. Techniques are provided to optimize server error logging to collect more and detailed data relevant to errors in the memory system to support improved error analysis, diagnosis, etc.

Some hardware errors in a memory system are correctable (e.g., corrected after retrying an operation in the memory system). A correctable error does not require restarting the computer system. Other hardware errors in a memory system are uncorrectable (e.g., by retrying an operating in the memory system). If the firmware or software of the computer system cannot recover from the error, the computer system is configured to restart in response to such an uncorrectable error. Logging correctable error can be useful in predicting uncorrectable errors.

The restarting of the computer system can be a challenge for a successful transfer of certain data related to the error reported using Machine Check Architecture (MCA) registers of a microprocessor, since the data can be altered after the restarting the execution of the operating system.

A server computer can be configured with a Baseboard Management Controller (BMC) to retrieve error data from the MCA registers to a storage area of the Baseboard Management Controller (BMC). Since the Baseboard Management Controller (BMC) can continue its normal operation even when the server computer restarts as a response to an uncorrectable error, the error data retrieved by the Baseboard Management Controller (BMC) from the MCA registers can be preserved successfully after the restart of the server computer. However, such data retrieved by the Baseboard Management Controller (BMC) directly from the microprocessor of the server computer does not have accurate information about the memory address where the hardware error occurs and/or other information useful for the decoding, analysis of the error data retrieved from the microprocessor of the server computer.

At least some aspects of the present disclosure address the above and other deficiencies by implementing a set of instructions to capture and store comprehensive data about a hardware error, which can be an uncorrectable error. The instructions, executed by the microprocessor encountering the error, can store the collected data about the error in a location in the computer system that is not affected by the restarting of the computer system.

For example, the instructions can be configured to store the collected data in a predefined area of a memory module, such as a memory region in the memory module configured to support Serial Presence Detect (SPD). To support SPD a memory module has a non-volatile memory that stores information about the memory module. The non-volatile memory in the memory module can include a portion that can be used to store user data. The instructions configured to handle errors can store the collected data in such a portion in the non-volatile memory configured to support SPD.

For example, the instructions can be configured to communicate the collected data to the Baseboard Management Controller (BMC) so that the data can be preserved after the server computer restarts.

At least a portion of the instructions can be configured in the firmware (e.g., the Basic Input/Output System (BIOS) of the server computer) and/or in the operating system such that comprehensive data about the hardware error is collected and preserved even when the server computer restarts as a result of the error. For example, the instructions configured in the firmware are used to collect data that can be changed by restarting of the operating system; and additional data that does not change by restarting of the operating system can be collected using the instructions configured in the operating system (e.g., to reduce the time of the execution of the instructions in the firmware in the system management mode in which the execution of the operating system is suspended). For example, the instructions can be programmed to collect the temperature of the memory module and/or the microprocessor at the time of the hardware error, the timestamp of the hardware error, an error count of the hardware error event reported by the memory module, the address information of the hardware error (e.g., the identification of a memory module, a group of memory bank in the memory module, a memory bank in the group, a row and a column in the memory bank in which the hardware error occur), a classification of the Machine Check Exception (MCE), a type of the hardware error, the setting and/or configuration parameters of the memory module that has the hardware error, the identification/serial number of the memory module in which the hardware error occurs, timing parameters of the memory module and/or the server computer at a time of the hardware error, etc.

After comprehensive data about hardware errors in a memory module is collected and preserved, even after the computer restarts as a response to the hardware errors, the collected data can be analyzed (e.g., by a supplier of memory modules) to improve memory modules to reduce errors. The comprehensive data can be used to predict future failures and reduce costs associated with hardware errors in services.

Figure 1:
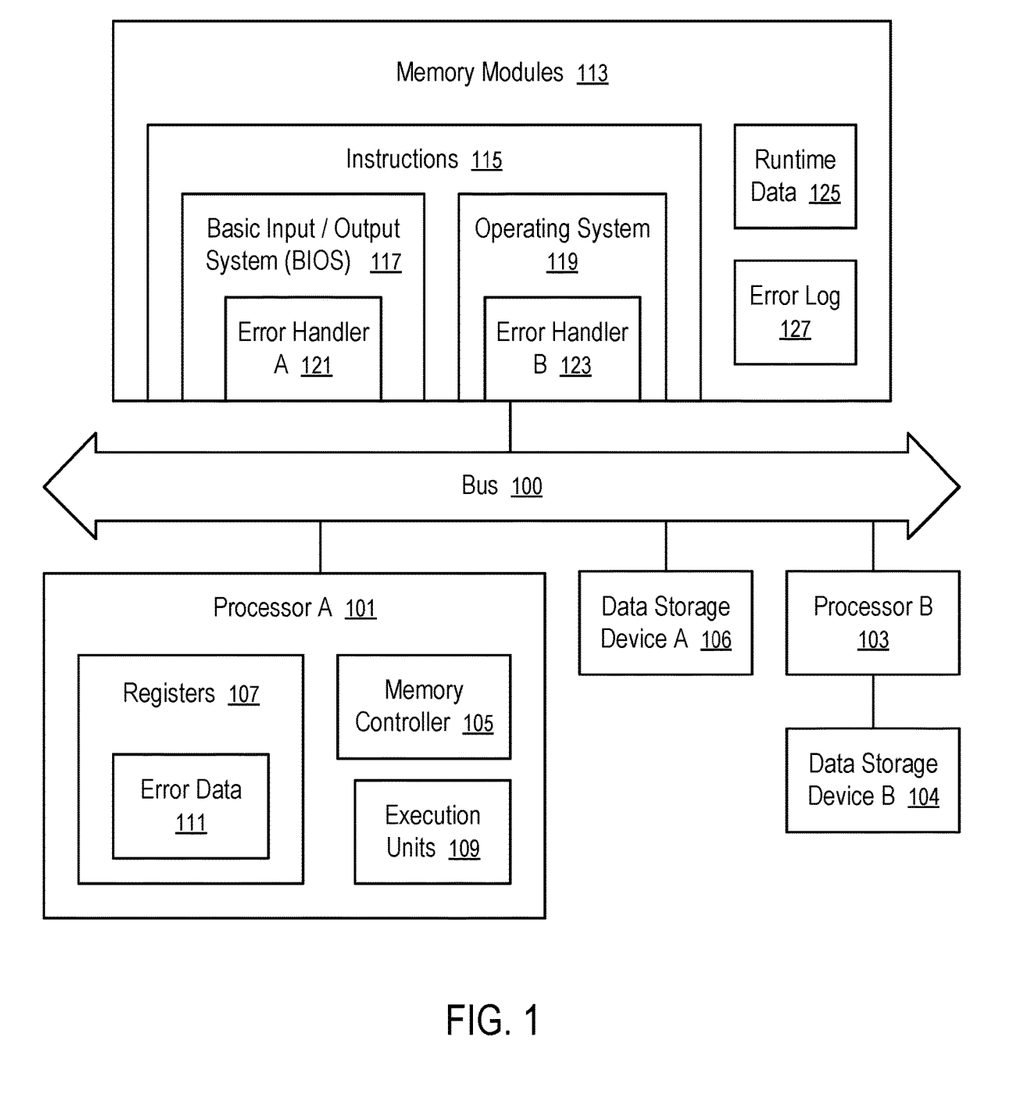
FIG. 1 illustrates an example computing system configured to log data related to a hardware error according to one embodiment.

FIG. 1 illustrates an example computing system configured to log data related to a hardware error according to one embodiment.

The computing system of FIG. 1 includes a processor 101 coupled to one or more memory modules 113, a data storage device 106 and a separate processor 103 via a bus 100. The bus 100 can include one or more buses, such as a memory bus having an address bus, a data bus and a control bus, a peripheral bus, a System Management Bus, and/or an Inter-Integrated Circuit bus, etc. Thus, the bus 100 is limited to a particular implementation of interconnect among the components.

The one or more memory modules 113 store instructions 115 for execution by a processor 101. The instructions 115 can include firmware, such as a Basic Input/Output System (BIOS) 117. The instructions 115 can include software, such as an operating system 119, and applications that programmed to use the services provided by the operating system 119.

The processor 101 includes a memory controller 105 that can load instructions 115 from the memory modules 113 for execution, and execution units 109 configured to perform operations identified by the instructions 115.

The processor 101 includes a set of registers 107 that are configured to store error data 111 when the processor 101 encounters a hardware error. For example, the registers 107 can be Machine Check Architecture (MCA) registers.

Typically, the error data 111 is encoded by the processor 101 for compact reporting of the hardware error to the operating system 119. Decoding the error data 111 for an error in accessing a memory location in the memory modules 113 can require additional data that may not be available once the computing system restarts the execution of the operating system 119.

In response to an error in accessing a memory location in the memory module 113, the processor 101 runs the Basic Input/Output System (BIOS) 117 (e.g., in a System Management Mode (SMM)). The Basic Input/Output System (BIOS) 117 can be programmed to include an error handler 121. When executed in the processor A 101 in response to a hardware error encountered by the processor 101, the error handler 121 causes the processor 101 to collect data relevant to the hardware error, including the error data 111 and additional data, to generate the error log 127.

For example, the additional data can include runtime data 125 of the computing system, such as the temperature of a memory module in which the hardware error occurs, the identification number of the memory module, the operation setting/configuration parameters of the memory module (e.g., timing parameters of the memory module), etc.

The error handler 121 as executed in the processor 101 can decode the error data 111 retrieved from the registers 107 in determining the physical memory address of the memory location where the hardware error occurs. For example, the error handler 121 can be configured to collect information that will, or is likely to, change as a result of restarting the computing system, such as the temperature of the memory module and/or the microprocessor at the time of the hardware error, the timestamp of the hardware error, an error count of the hardware error event reported by the memory module, the address information of the hardware error (e.g., the identification of a memory module, a group of memory bank in the memory module, a memory bank in the group, a row and a column in the memory bank in which the hardware error occur), a classification of the Machine Check Exception (MCE), a type of the hardware error, etc. Information that is not likely to change due to restarting of the computing system can be configured to be collected via an error handler 123 configured in the operating system 119 to reduce the impact of the execution of the error handler 121 to the execution of the operating system 119. For example, the error handler 123 can be used to collect the setting and/or configuration parameters of the memory module that has the hardware error, the identification/serial number of the memory module in which the hardware error occurs, timing parameters of the memory module and/or the server computer at a time of the hardware error, version numbers of software, etc.

The error handler 121 is programmed to store the error log 127 in a location without the assistance of the operating system 119.

For example, the error log 127 about a hardware error in a memory module can be stored, via the execution of the error handler 121, in a user data area of a non-volatile memory of the memory module configured to support Serial Presence Detect (SPD). The non-volatile memory configured to support SPD can be referred to as SPD memory.

Storing the error log 127 in a non-volatile memory of the memory module in which the error occurs allows the memory module to be removed from the computing system of FIG. 1, attached to an alternative system for the retrieval of the error log 127 for diagnosis, analysis, and/or fault mitigation. For example, the memory module can provide Dynamic Random Access Memory (DRAM) to the processor 101. When the execution of the operating system 119 is restarted, the content previously stored in the DRAM is erased. When the error log 127 is stored in the SPD memory of the memory module, the error log 127 is preserved after the restart of the computing system and/or after the power is removed from the memory module for a period of time.

Alternatively, or in combination, the error handler 121 can be programmed to communicate the error log 127 to a separate processor 103, which stores the error log 127 into a data storage device 104 that is operated by the separate processor 103 independently from the main processor 101 that runs the instructions 115.

For example, the processor 101 can be the main processor of the computing system of FIG. 1 to run the instructions; and the separate processor 103 and the data storage device 104 can be configured as a Baseboard Management Controller (BMC) to monitor and manage the operations of the main processor 101. The data storage device 104 of the Baseboard Management Controller (BMC) can be a portion of volatile memory configured for the processor 103, and/or a persistent and/or non-volatile storage device configured in the Baseboard Management Controller (BMC).

The Baseboard Management Controller (BMC) can operate autonomously and independently from the main processor 101 running the Basic Input/Output System (BIOS) 117 and/or the operating system 119. The main processor 101 executing the error handler 121 can communicate the error log 127 for the current hardware error to the Baseboard Management Controller (BMC) using Intelligent Platform Management Interface (IPMI). When the main processor 101 restarts the execution of the operating system 119, the error log 127 in the Baseboard Management Controller (BMC) is not affected and thus is preserved.

The error handler 121 in the Basic Input/Output System (BIOS) 117 can pass the error log 127 about the current hardware error to the operating system 119 after the execution of the operating system 119 is restarted following an uncorrectable error, or after the execution of the operating system 119 is resumed following a correctable error.

The processor 101 running the operating system 119 can access the data storage device 106, such as a hard drive, a solid state drive, etc. For example, the operating system 119 can include an error handler 123 that is programmed to store the error log 127 in a file system for subsequent use.

After an uncorrectable error occurs in the memory modules 113, the processor 101 runs the Basic Input/Output System (BIOS) 117 (e.g., in a System Management Mode (SMM) to suspend the execution of the operating system 119 and applications that use the services of the operating system 119). The processor 101 running the error handler of the Basic Input/Output System (BIOS) 117 initially stores the error log 127 in a location that is not affected by the restarting of the computing system (e.g., in SPD memory and/or in the data storage device 104 of a Baseboard Management Controller). After restarting the execution of the operating system 119, the processor 101 running the error handler 123 in the operating system 119 can retrieve the error log 127 from the location to record the error log into a file in the data storage device 106 controlled by the operating system 119.

When the hardware error is correctable, the processor 101 can resume the previous execution of the operating system 119 after the execution of the error handler 121 in the Basic Input/Output System (BIOS) 117, without restarting the computing system of FIG. 1. Optionally, in response to a correctable error, the error handler 121 in the Basic Input/Output System (BIOS) 117 passes the error log 127 to the error handler 123 in the operating system 119 (e.g., using a memory shared between the Basic Input/Output System (BIOS) 117 and the operating system 119) without preserving the error log 127 into the location that is not affected by the restarting of the computing system.

Figure 2:
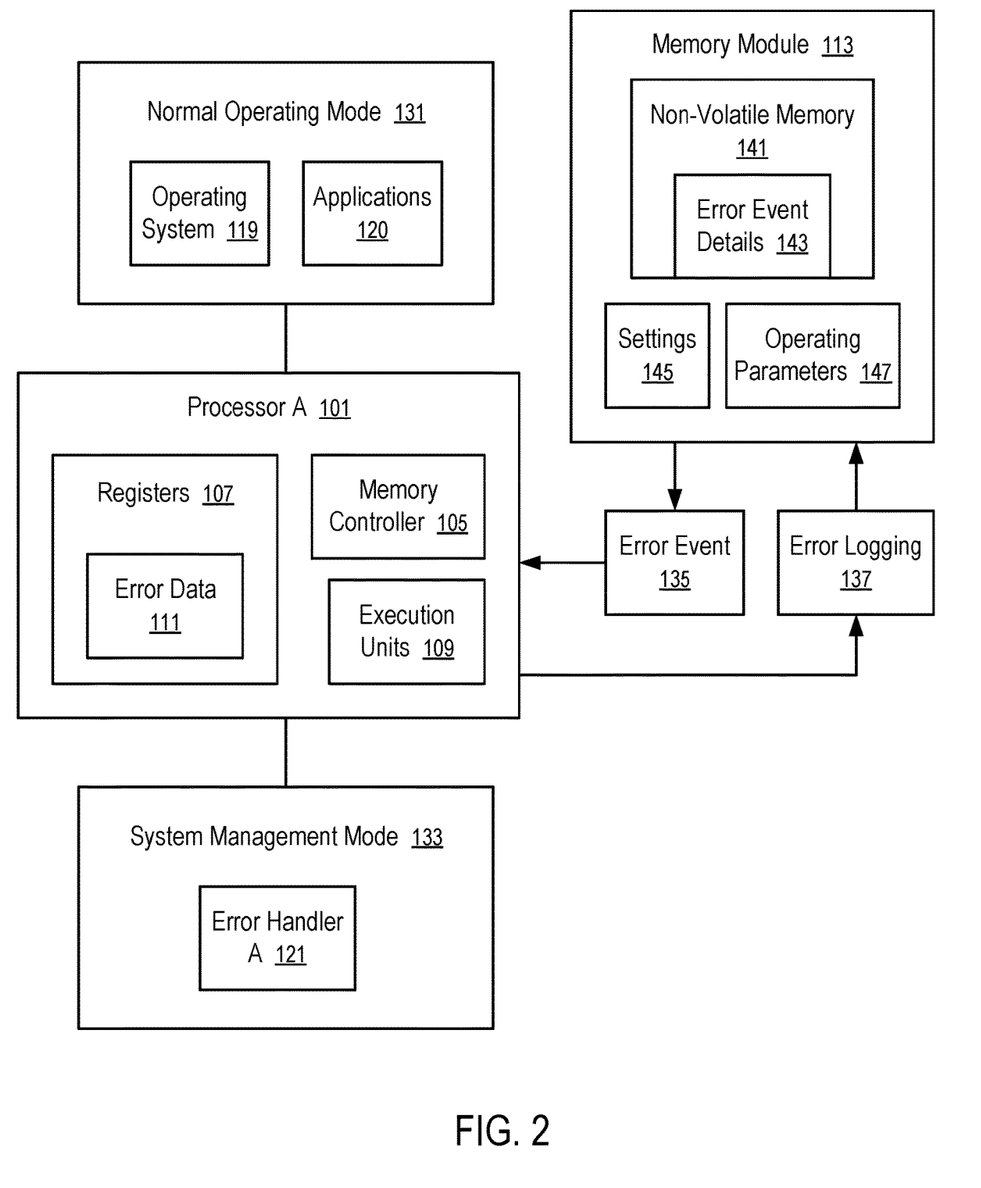
FIGS. 2 and 3 show techniques to record data related to an error in a memory module according to some embodiments.
Figure 3:
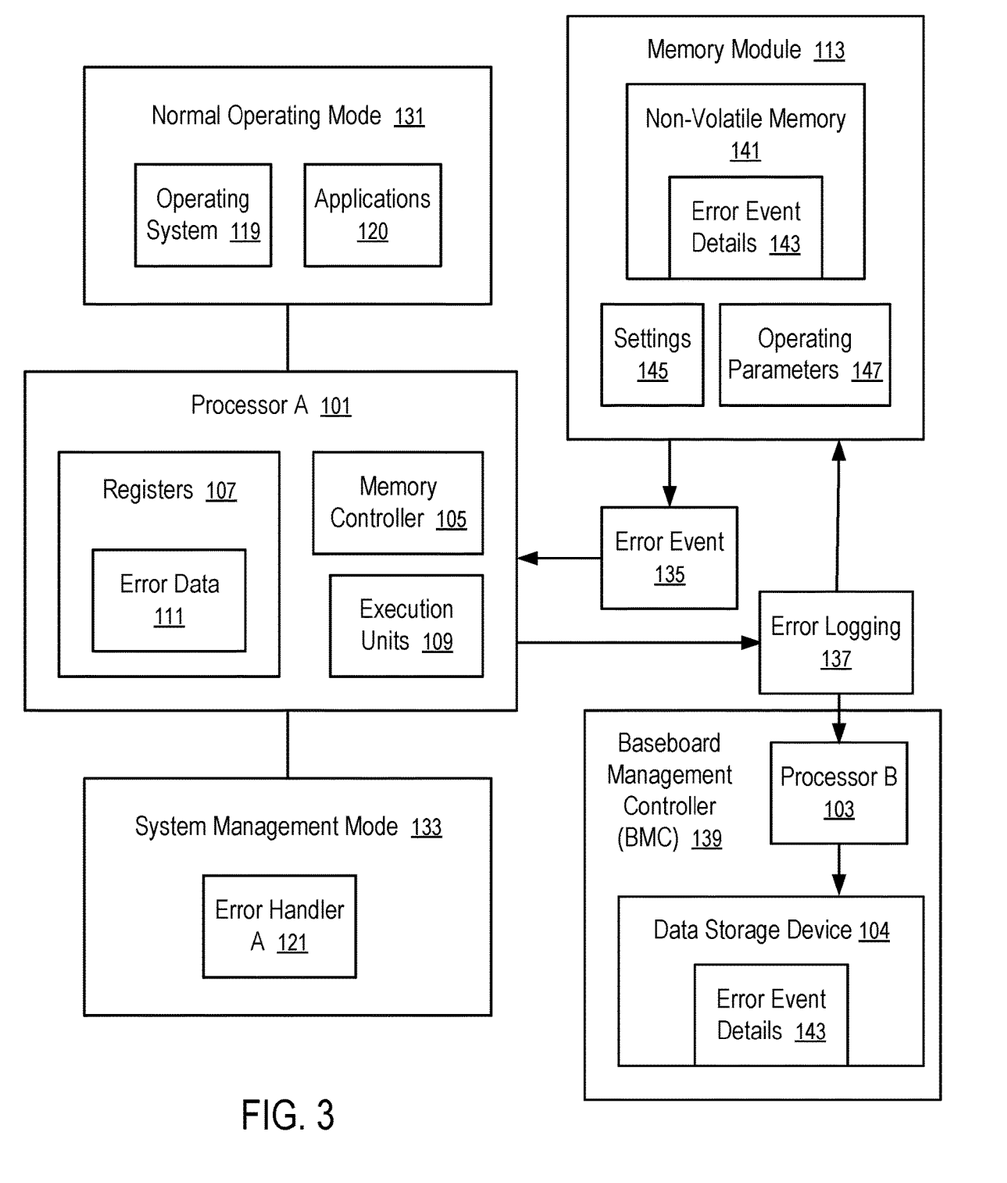

FIGS. 2 and 3 show techniques to record data related to an error in a memory module according to some embodiments. For example, the techniques of FIGS. 2 and 3 can be implemented in the computing system of FIG. 1.

In FIG. 2, the processor 101 can operate in a normal operating mode 131 to execute instructions of an operating system 119 and applications 120 that use the services of the operating system 119. Further, the processor 101 can operate in a system management mode 133 in which the execution of the instructions of the operating system 119 and applications 120 is suspended to run the error handler 121 of the Basic Input/Output System (BIOS) 117, in response to an indication of an error event 135 from a memory module 113.

The memory module 113 has a non-volatile memory, such as a SPD memory, that is not used by typically operations of the operating system 119 and the applications 120.

During the execution of the error handler 121 in the system management mode 133, the processor 101 decodes the error data 111 to generate the error event details 143 for the error event 135. In an operation of error logging 137, the processor 101 running the error handler 121 stores the error event details into the non-volatile memory 141 of the memory module 113 (e.g., a user-accessible portion of SPD memory).

For example, the error event details 143 can include the physical address of the memory location in the memory module 113 has the error event (e.g., row and column addresses of the memory location) by decoding the error data 111 in the registers 107 of the processor 101.

The error event details 143 can include the settings 145 of the memory module 113 at the time of the error event 135 and the operating parameters 147 of the memory module 113 and/or the computing system, such as temperature, timing parameters, etc.

The error event details 143 can be used after the memory module 113 is restarted and/or after being powered off for a period of time, without relying upon the state the computing system and/or without requiring the processor 101 to resume the suspended execution of the operating system 119.

Optionally, the error event details 143 can include an identification of the memory module 113, an identification of the processor 101, a context of the error event 135, an operating condition of the processor 101 and/or the memory module 113 at the time of the event 135. The error event details can be used to analyze the causes of errors, to predict future errors, to improve the design of memory modules to avoid or reduce errors, etc.

In FIG. 3, the operation of error logging 137 performed via the processor 101 executing the error handler 121 communicates the error event details 143 to a Baseboard Management Controller (BMC) 139. The processor 103 of the Baseboard Management Controller (BMC) 139 stores the error event details 143 into a data storage device 104 controlled by the processor 103. Restarting of the execution of the operating system 119 in the main processor 101 does not affect the error event details 143 recorded in the Baseboard Management Controller (BMC) 139.

Optionally, the error event details 143 is stored in the data storage device 104 but not in the non-volatile memory 141 of the memory module 113.

Figure 4:
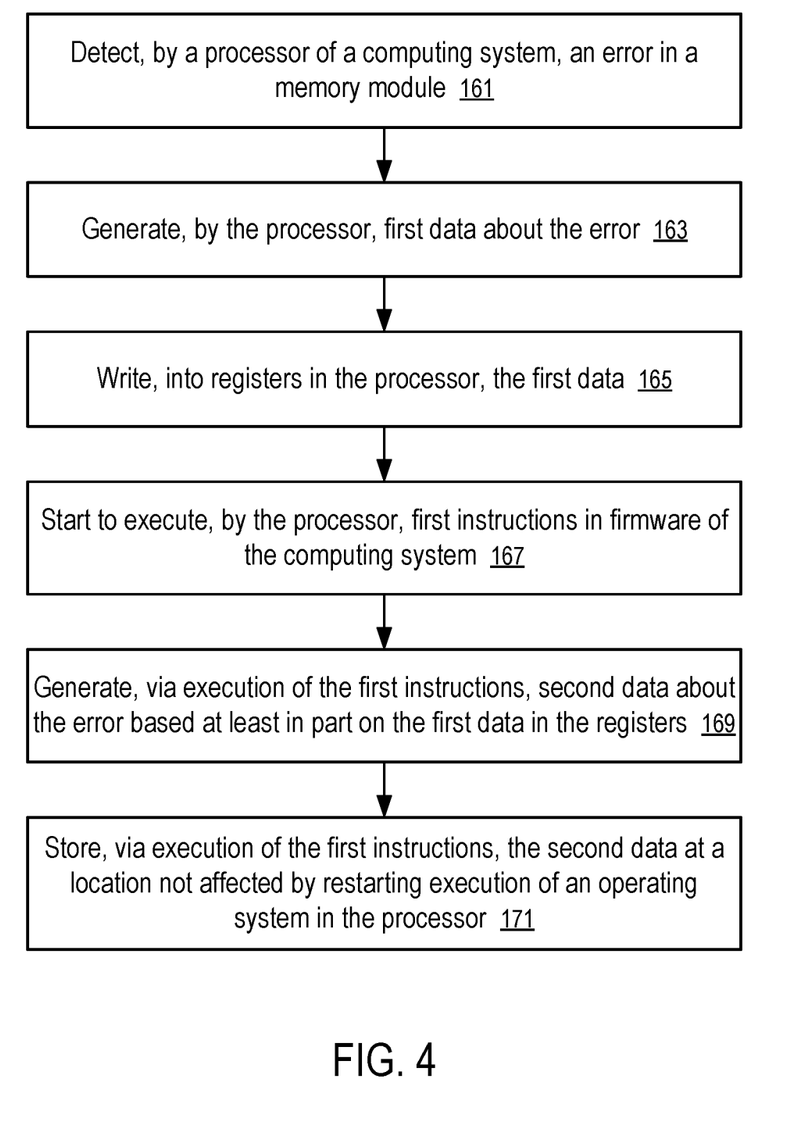
FIG. 4 shows a method to log data related to a hardware error according to one embodiment.

FIG. 4 shows a method to log data related to a hardware error according to one embodiment. For example, the method of FIG. 4 can be implemented in the computing system of FIG. 1 using the techniques of FIG. 2 and/or FIG. 3.

At block 161, a processor 101 of a computing system (e.g., as illustrated in FIG. 1) detects an error in a memory module 113 (or in another hardware component of the computing system).

For example, the processor 101 can be a microprocessor configured with a mechanism report hardware errors to the operating system 119 running in the microprocessor, such as Machine Check Architecture (MCA).

At block 163, the processor 101 generates first data (e.g., error data 111) about the error.

At block 165, the processor 101 writes, into registers 107 in the processor 101, the first data (e.g., error data 111).

For example, the first data (e.g., error data 111) can be in an encoded format according to a predefined specification of Machine Check Architecture (MCA).

To report the hardware error to the operating system 119 running in the processor 101, the processor 101 can enter a mode (e.g., System Management Mode 133) in which the execution of the operating system 119 is suspended to execute firmware of the computing system to process the first data (e.g., error data 111). The firmware can be programmed to include an error handler 121. When the error handler 121 is executed in the processor 101, the operations of blocks 169 and 171 are performed.

At block 167, the processor 101 starts to execute first instructions (e.g., error handler 121) in firmware of the computing system (e.g., as illustrated in FIG. 1).

For example, the first instructions (e.g., error handler 121) can be configured as part of a Basic Input/Output System (BIOS) of the computing system, which is executed in response to a hardware error in a system management mode 133.

At block 169, the processor 101 generates, via execution of the first instructions (e.g., error handler 121), second data (e.g., error log 127, error event details 143) about the error based at least in part on the first data (e.g., error data 111) in the registers 107.

At block 171, the processor 101 stores, via execution of the first instructions (e.g., error handler 121), the second data (e.g., error log 127, error event details 143) at a location that is not affected by restarting execution of an operating system 119 in the processor 101.

For example, during restarting execution of the operating system 119, the processor 101 runs the Basic Input/Output System (BIOS) 117 to initialize the states of various components in the computing system. The initialization operation can clear the data in at least a portion of the capacity of the memory modules 113. Thus, the restarting of the execution of the operating system 119 can affect this portion of the memory modules 113.

For example, the location that is not affected by restarting execution of then operating system 119 in the processor 101 can be a predefined non-volatile memory configured in the memory module 113, such as the memory configured to implement/support Serial Presence Detect (SPD).

For example, the location that is not affected by restarting execution of then operating system 119 in the processor 101 can be a Baseboard Management Controller (BMC) 139 connected to the processor 101.

For example, the processor 101 decodes, via execution of the first instructions (e.g., error handler 121), the first data (e.g., error data 111) to determine a physical memory address of the error as part of the second data (e.g., error log 127, error event details 143).

After a hardware error, the computing system may not be able to recovery from the error without restarting. Thus, after the executing of the first instructions (e.g., error handler 121), the processor 101 can restart execution of the operating system 119, which can be configured to include second instructions (e.g., error handler 123) programmed to retrieve the second data (e.g., error log 127, error event details 143) from the location and write the second data into a data storage device 106 controlled by the operating system 119.

In some instances, the computing system can recovery from the error without restarting. Thus, after the executing of the first instructions (e.g., error handler 121), the processor 101 can resume the suspended execution of the operating system 119, which can be configured to include second instructions (e.g., error handler 123) programmed to write the second data into a data storage device 106 controlled by the operating system 119.

Optionally, the processor 101 determines, via execution of the first instructions (e.g., error handler 121), an operating parameter 147 of the computing system at a time of the error; and the second data (e.g., error log 127, error event details 143) includes the operating parameter 147.

For example, the operating parameter 147 can be a temperature of the memory module 113, a temperature of the processor 101, a setting 145 of the memory module 113, or a timing parameter of operating the memory module 113, or any combination thereof.

Optionally, the second data (e.g., error log 127, error event details 143) further includes an identifier of the memory module 113, or an identifier of the processor 101, or any combination thereof.

In some implementations, when executed by a microprocessor (e.g., processor 101), the first instructions (e.g., error handler 121) are programmed to decode the first data (e.g., error data 111) stored in registers 107 of a microprocessor (e.g., processor 101) in response to the error in the memory module 113, generate the second data (e.g., error log 127, error event details 143) from a result of decoding the first data (e.g., error data 111), and communicate with the memory module 113 to store the second data into the non-volatile memory 141 of the memory module 113. Alternatively, or in combination with storing the second data into the non-volatile memory 141 of the memory module 113, the first instructions (e.g., error handler 121) are programmed to communicate the second data to a Baseboard Management Controller (BMC) 139 connected to the microprocessor (e.g., processor 101).

For example, the non-volatile memory 141 is configured to implement Serial Presence Detect (SPD); and the registers 107 are configured to implement Machine Check Architecture (MCA).

In some implementations, when executed by a microprocessor (e.g., processor 101), the first instructions (e.g., error handler 121) are programmed to: retrieve, from registers 107 of the microprocessor (e.g., processor 101), the first data (e.g., error data 111) about the hardware error; generate, based on the first data, the second data (e.g., error log 127, error event details 143) about the hardware error prior to restarting execution of an operating system 119 following the hardware error; and communicating the second data from the microprocessor (e.g., processor 101) to a controller (e.g., Baseboard Management Controller (BMC) 139) connected to the microprocessor. The controller is configured to monitor operations of the microprocessor and to record the second data.

The second data (e.g., error log 127, error event details 143) can be generated based on the first data (e.g., error data 111) and third data (e.g., settings 145, operating parameters 147, runtime data 125) located in the computing device having the microprocessor (e.g., processor 101) but outside of the microprocessor (e.g., inside the memory module 113) at a time of the hardware error. Thus, merely recording the first data (e.g., error data 111) is insufficient to generate the second data (e.g., error log 127, error event details 143) after restarting the execution of the operating system 119, since restarting can erase the third data.

Figure 5:
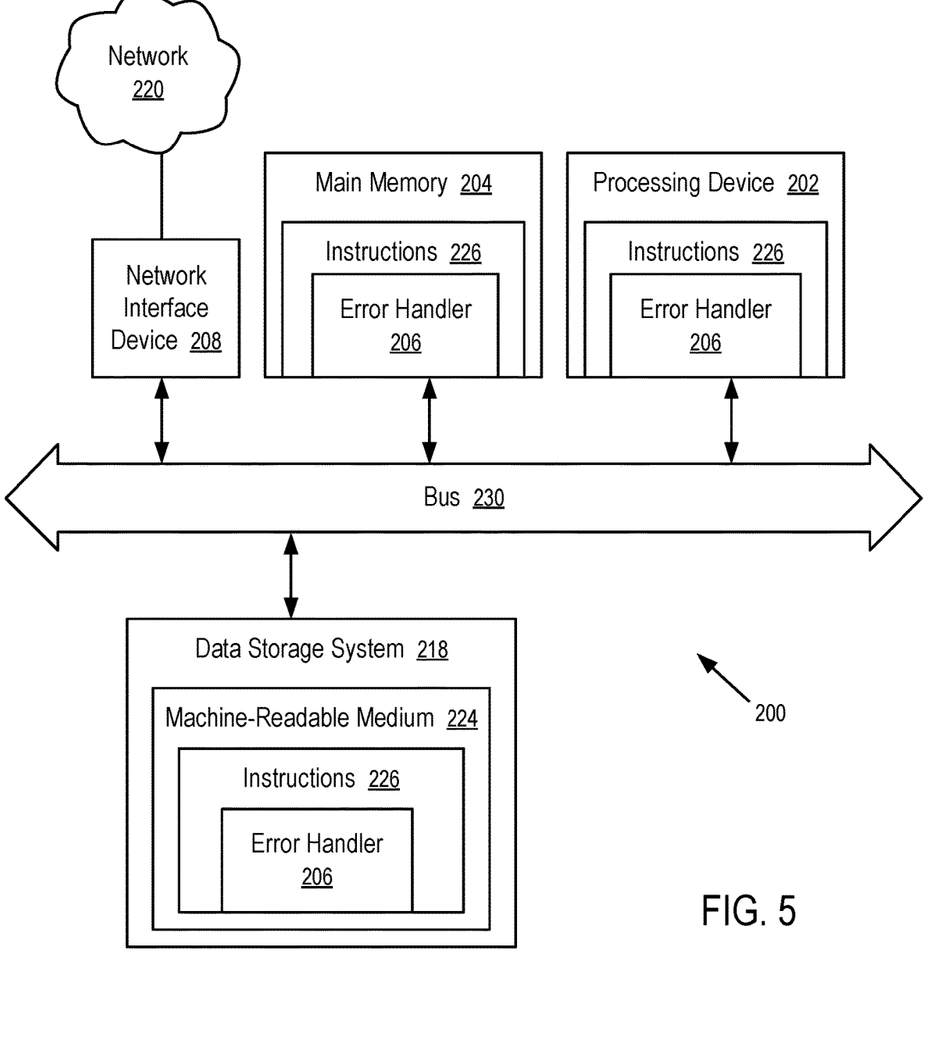
FIG. 5 is a block diagram of an example computer system in which embodiments of the present disclosure can operate.

FIG. 5 illustrates an example machine of a computer system 200 within which a set of instructions, for causing the machine to perform any one or more of the methodologies discussed herein, can be executed. In some embodiments, the computer system 200 can correspond to a host system that includes, is coupled to, or utilizes a memory sub-system or can be used to perform the operations of an error handler 206 (e.g., to execute instructions to perform operations corresponding to the error handler 121 and/or the error handler 123 described with reference to FIGS. 1-4). In alternative embodiments, the machine can be connected (e.g., networked) to other machines in a LAN, an intranet, an extranet, and/or the Internet. The machine can operate in the capacity of a server or a client machine in client-server network environment, as a peer machine in a peer-to-peer (or distributed) network environment, or as a server or a client machine in a cloud computing infrastructure or environment.

The machine can be a server, a personal computer (PC), a tablet PC, a set-top box (STB), a Personal Digital Assistant (PDA), a cellular telephone, a web appliance, a network router, a switch or bridge, or any machine capable of executing a set of instructions (sequential or otherwise) that specify actions to be taken by that machine. Further, while a single machine is illustrated, the term "machine" shall also be taken to include any collection of machines that individually or jointly execute a set (or multiple sets) of instructions to perform any one or more of the methodologies discussed herein.

The example computer system 200 includes a processing device 202, a main memory 204 (e.g., read-only memory (ROM), flash memory, dynamic random access memory (DRAM) such as synchronous DRAM (SDRAM) or Rambus DRAM (RDRAM), static random access memory (SRAM), etc.), and a data storage system 218, which communicate with each other via a bus 230 (which can include multiple buses).

Processing device 202 represents one or more general-purpose processing devices such as a microprocessor, a central processing unit, or the like. More particularly, the processing device can be a complex instruction set computing (CISC) microprocessor, reduced instruction set computing (RISC) microprocessor, very long instruction word (VLIW) microprocessor, or a processor implementing other instruction sets, or processors implementing a combination of instruction sets. Processing device 202 can also be one or more special-purpose processing devices such as an application specific integrated circuit (ASIC), a field programmable gate array (FPGA), a digital signal processor (DSP), network processor, or the like. The processing device 202 is configured to execute instructions 226 for performing the operations and steps discussed herein. The computer system 200 can further include a network interface device 208 to communicate over the network 220.

The data storage system 218 can include a machine-readable medium 224 (also known as a computer-readable medium) on which is stored one or more sets of instructions 226 or software embodying any one or more of the methodologies or functions described herein. The instructions 226 can also reside, completely or at least partially, within the main memory 204 and/or within the processing device 202 during execution thereof by the computer system 200, the main memory 204 and the processing device 202 also constituting machine-readable storage media. The machine-readable medium 224, data storage system 218, and/or main memory 204 can correspond to a memory sub-system.

In one embodiment, the instructions 226 include instructions to implement functionality corresponding to an error handler 206 (e.g., operations of the error handler 121 and/or the error handler 123 described with reference to FIGS. 1-4). While the machine-readable medium 224 is shown in an example embodiment to be a single medium, the term "machine-readable storage medium" should be taken to include a single medium or multiple media that store the one or more sets of instructions. The term "machine-readable storage medium" shall also be taken to include any medium that is capable of storing or encoding a set of instructions for execution by the machine and that cause the machine to perform any one or more of the methodologies of the present disclosure. The term "machine-readable storage medium" shall accordingly be taken to include, but not be limited to, solid-state memories, optical media, and magnetic media.

In general, a computing device to implement the techniques of FIGS. 2 and/or 3 can be a computing system having a host system and a memory sub-system. The memory sub-system can include media, such as one or more volatile memory devices, one or more non-volatile memory devices (e.g., memory module 113), or a combination of such.

A memory sub-system can be a storage device, a memory module, or a hybrid of a storage device and memory module. Examples of a storage device include a solid-state drive (SSD), a flash drive, a universal serial bus (USB) flash drive, an embedded Multi-Media Controller (eMMC) drive, a Universal Flash Storage (UFS) drive, a secure digital (SD) card, and a hard disk drive (HDD). Examples of memory modules include a dual in-line memory module (DIMM), a small outline DIMM (SO-DIMM), and various types of non-volatile dual in-line memory module (NVDIMM).

For example, the computing system can be a computing device such as a desktop computer, a laptop computer, a network server, a mobile device, a vehicle (e.g., airplane, drone, train, automobile, or other conveyance), an Internet of Things (IoT) enabled device, an embedded computer (e.g., one included in a vehicle, industrial equipment, or a networked commercial device), or such a computing device that includes memory and a processing device.

The host system of the computing system is coupled to one or more memory sub-systems. As used herein, "coupled to" or "coupled with" generally refers to a connection between components, which can be an indirect communicative connection or direct communicative connection (e.g., without intervening components), whether wired or wireless, including connections such as electrical, optical, magnetic, etc.

The host system can include a processor chipset (e.g., processor 101) and a software stack executed by the processor chipset. The processor chipset can include one or more cores, one or more caches, a memory controller (e.g.,

105) (e.g., NVDIMM controller), and a storage protocol controller (e.g., PCIe controller, SATA controller). The host system uses the memory sub-system, for example, to write data to the memory sub-system and read data from the memory sub-system.

The host system can be coupled to the memory sub-system via a physical host interface. Examples of a physical host interface include, but are not limited to, a serial advanced technology attachment (SATA) interface, a peripheral component interconnect express (PCIe) interface, a universal serial bus (USB) interface, a Fibre Channel, a Serial Attached SCSI (SAS) interface, a double data rate (DDR) memory bus interface, a Small Computer System Interface (SCSI), a dual in-line memory module (DIMM) interface (e.g., DIMM socket interface that supports Double Data Rate (DDR)), an Open NAND Flash Interface (ONFI), a Double Data Rate (DDR) interface, a Low Power Double Data Rate (LPDDR) interface, or any other interface. The physical host interface can be used to transmit data between the host system and the memory sub-system. The host system can further utilize an NVM Express (NVMe) interface to access components (e.g., memory module 113) when the memory sub-system is coupled with the host system by the PCIe interface. The physical host interface can provide an interface for passing control, address, data, and other signals between the memory sub-system and the host system. In general, the host system can access one or more memory sub-systems via a same communication connection, multiple separate communication connections, and/or a combination of communication connections.

A processing device of the host system can be, for example, a microprocessor, a central processing unit (CPU), a processing core of a processor, an execution unit, etc. In some instances, the controller 105 can be referred to as a memory controller, a memory management unit, and/or an initiator. In one example, the controller 105 controls the communications over a bus 100 coupled between the host system and the memory sub-system (e.g., memory modules 113). In general, the controller 105 can send commands or requests to the memory sub-system for desired access to memory modules 113. The controller 105 can further include interface circuitry to communicate with the memory sub-system.

The memory modules 113 can include any combination of the different types of non-volatile memory components and/or volatile memory components. The volatile memory devices can be, but are not limited to, random access memory (RAM), such as dynamic random access memory (DRAM) and synchronous dynamic random access memory (SDRAM).

Some examples of non-volatile memory components include a negative-and (or, NOT AND) (NAND) type flash memory and write-in-place memory, such as three-dimensional cross-point ("3D cross-point") memory. A cross-point array of non-volatile memory can perform bit storage based on a change of bulk resistance, in conjunction with a stackable cross-gridded data access array. Additionally, in contrast to many flash-based memories, cross-point non-volatile memory can perform a write in-place operation, where a non-volatile memory cell can be programmed without the non-volatile memory cell being previously erased. NAND type flash memory includes, for example, two-dimensional NAND (2D NAND) and three-dimensional NAND (3D NAND).

Each of the memory module 113 can include one or more arrays of memory cells. One type of memory cell, for example, single level cells (SLC) can store one bit per cell. Other types of memory cells, such as multi-level cells (MLCs), triple level cells (TLCs), quad-level cells (QLCs), and penta-level cells (PLCs) can store multiple bits per cell. In some embodiments, each of the memory modules 113 can include one or more arrays of memory cells such as SLCs, MLCs, TLCs, QLCs, PLCs, or any combination of such. In some embodiments, a particular memory device can include an SLC portion, an MLC portion, a TLC portion, a QLC portion, and/or a PLC portion of memory cells. The memory cells of the memory modules 113 can be grouped as pages that can refer to a logical unit of the memory device used to store data. With some types of memory (e.g., NAND), pages can be grouped to form blocks.

Although non-volatile memory devices such as 3D cross-point type and NAND type memory (e.g., 2D NAND, 3D NAND) are described, the memory module 113 can be based on any other type of non-volatile memory, such as read-only memory (ROM), phase change memory (PCM), self-selecting memory, other chalcogenide based memories, ferroelectric transistor random-access memory (FeTRAM), ferroelectric random access memory (FeRAM), magneto random access memory (MRAM), Spin Transfer Torque (STT)-MRAM, conductive bridging RAM (CBRAM), resistive random access memory (RRAM), oxide based RRAM (OxRAM), negative-or (NOR) flash memory, and electrically erasable programmable read-only memory (EEPROM).

Some portions of the preceding detailed descriptions have been presented in terms of algorithms and symbolic representations of operations on data bits within a computer memory. These algorithmic descriptions and representations are the ways used by those skilled in the data processing arts to most effectively convey the substance of their work to others skilled in the art. An algorithm is here, and generally, conceived to be a self-consistent sequence of operations leading to a desired result. The operations are those requiring physical manipulations of physical quantities. Usually, though not necessarily, these quantities take the form of electrical or magnetic signals capable of being stored, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. The present disclosure can refer to the action and processes of a computer system, or similar electronic computing device, that manipulates and transforms data represented as physical (electronic) quantities within the computer system's registers and memories into other data similarly represented as physical quantities within the computer system memories or registers or other such information storage systems.

The present disclosure also relates to an apparatus for performing the operations herein. This apparatus can be specially constructed for the intended purposes, or it can include a general purpose computer selectively activated or reconfigured by a computer program stored in the computer. Such a computer program can be stored in a computer readable storage medium, such as, but not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions, each coupled to a computer system bus.

The algorithms and displays presented herein are not inherently related to any particular computer or other apparatus. Various general purpose systems can be used with programs in accordance with the teachings herein, or it can prove convenient to construct a more specialized apparatus to perform the method. The structure for a variety of these systems will appear as set forth in the description below. In addition, the present disclosure is not described with reference to any particular programming language. It will be appreciated that a variety of programming languages can be used to implement the teachings of the disclosure as described herein.

The present disclosure can be provided as a computer program product, or software, that can include a machine-readable medium having stored thereon instructions, which can be used to program a computer system (or other electronic devices) to perform a process according to the present disclosure. A machine-readable medium includes any mechanism for storing information in a form readable by a machine (e.g., a computer). In some embodiments, a machine-readable (e.g., computer-readable) medium includes a machine (e.g., a computer) readable storage medium such as a read only memory ("ROM"), random access memory ("RAM"), magnetic disk storage media, optical storage media, flash memory components, etc.

In this description, various functions and operations are described as being performed by or caused by computer instructions to simplify description. However, those skilled in the art will recognize what is meant by such expressions is that the functions result from execution of the computer instructions by one or more controllers or processors, such as a microprocessor. Alternatively, or in combination, the functions and operations can be implemented using special purpose circuitry, with or without software instructions, such as using Application-Specific Integrated Circuit (ASIC) or Field-Programmable Gate Array (FPGA). Embodiments can be implemented using hardwired circuitry without software instructions, or in combination with software instructions. Thus, the techniques are limited neither to any specific combination of hardware circuitry and software, nor to any particular source for the instructions executed by the data processing system.

In the foregoing specification, embodiments of the disclosure have been described with reference to specific example embodiments thereof. It will be evident that various modifications can be made thereto without departing from the broader spirit and scope of embodiments of the disclosure as set forth in the following claims. The specification and drawings are, accordingly, to be regarded in an illustrative sense rather than a restrictive sense.

What is claimed is:

1. A method, comprising:
    detecting, by a processor of a computing system, an error in a memory module;
    generating, by the processor, first data about the error;
    writing, into registers in the processor, the first data;
    entering a system management mode configured to suspend execution of an operating system and applications; and
    executing, by the processor in the system management mode, first instructions in firmware of Basic Input/Output System (BIOS) of the computing system to perform operations including:
        generating second data about the error based at least in part on decoding the first data in the registers and in response to the error, wherein the second data is further generated based on third data located in the computing system but outside of the processor of the computing system at a time of the error, wherein the second data comprises error event details identifying the memory module, a context of the error, and a row and a column for the memory location in a memory bank of the memory module;
    storing the second data at a location not affected by restarting execution of the operating system in the processor,
    determining a cause for the error based on at least the context of the error from the error event details; and
    predicting, after the memory module is powered off for a period of time or is restarted, a future error for the memory module based on the error and the error event details identifying the memory module, the context of the error, the row and the column for the memory location in the memory bank of the memory module and the cause for the error, wherein the error event details are utilized for predicting the future error without relying upon a state of the computing system.

2. The method of claim 1, wherein the executing of the first instructions is by the processor in a mode in which execution of the operating system in the processor is suspended as a result of the error.

3. The method of claim 2, wherein the first instructions are configured as part of a Basic Input/Output System (BIOS) of the computing system.

4. The method of claim 3, wherein the operations performed via the executing of the first instructions further comprise:
    decoding the first data to determine a physical memory address of the error associated with the row and the column, wherein the second data includes the physical memory address.

5. The method of claim 4, wherein the location is in a non-volatile memory configured in the memory module.

6. The method of claim 5, wherein the non-volatile memory is configured to support Serial Presence Detect (SPD).

7. The method of claim 4, wherein the location is in a Baseboard Management Controller (BMC) connected to the processor.

8. The method of claim 4, further comprising:
    restarting, if the error is identified as an uncorrectable error, execution of the operating system after the executing of the first instructions, including executing second instructions configured in the operating system to write the second data into a storage device controlled by the operating system and
    retrieve the second data comprising the error event details from the location not affected by restarting execution of the operating system in the processor; and
    record the second data into a file of a data storage device controlled by the operating system.

9. The method of claim 4, further comprising:
    resuming, if the error is identified as a correctable error, the suspended execution of the operating system after the executing of the first instructions, including executing second instructions configured in the operating system to write the second data into a storage device controlled by the operating system;
    passing the second data comprising the error event details to an error handler in the operating system without preserving the second data comprising the error event details in the location not affected by restarting execution of the operating system in the processor.

10. The method of claim 4, wherein the operations performed via the executing of the first instructions further comprise:
   determining an operating parameter of the computing system at a time of the error, wherein the second data includes the operating parameter.

11. The method of claim 10, wherein the operating parameter includes a temperature of the memory module, a temperature of the processor, a setting of the memory module, or a timing parameter of operating the memory module, or any combination thereof.

12. The method of claim 11, wherein the second data further includes an identifier of the memory module, or an identifier of the processor, or any combination thereof.

13. An apparatus, comprising:
   a memory module having a non-volatile memory and a volatile memory; and
   a microprocessor of a computing device configured via instructions of Basic Input/Output System (BIOS) executed during a system management mode to, in response to an error in the memory module and prior to restarting of the apparatus as a result of the error:
      decode first data about the error, wherein the first data is stored in registers of the microprocessor in response to the error in the memory module;
      generate second data from a result of decoding the first data and in response to the error, the second data error event details including a temperature, an identification of the memory module, and a context for the error, wherein the second data is further generated based on third data located in the computing device but outside of the microprocessor of the computing device at a time of the error;
      communicate with the memory module to store the second data into the non-volatile memory;
      determining a cause for the error based on at least the context of the error from the error event details; and
      predicting a future error associated with the memory module based on the error and the error event details and the cause for the error, wherein the error event details are utilized for predicting the future error without relying upon a state of the computing device.

14. The apparatus of claim 13, further comprising:
   a Baseboard Management Controller (BMC) connected to the microprocessor, wherein the microprocessor is configured via the instructions to further communicate the second data to the BMC.

15. The apparatus of claim 14, wherein the non-volatile memory is configured to implement Serial Presence Detect (SPD); and the registers are configured to implement Machine Check Architecture (MCA).

16. A non-transitory computer readable storage medium storing instructions which, when executed by a microprocessor in a computing device, causes the computing device to perform a method, comprising:
   retrieving, in response to a hardware error in the computing device and from registers of the microprocessor, first data about the hardware error during execution of the instructions as part of Basic Input/Output System (BIOS) in a system management mode;
   generating, based on the first data and in response to the error, second data about the hardware error prior to restarting execution of an operating system of the computing device after the hardware error, the second data including error event details including a context of the error, a timestamp of the hardware error and an error count of the hardware error, wherein the second data is further generated based on third data located in the computing device but outside of the microprocessor at a time of the hardware error;
   communicating the second data from the microprocessor to a controller connected to the microprocessor in the computing device, wherein the controller is configured to monitor operations of the microprocessor and to record the second data;
   determining a cause for the error based on at least the context of the error from the error event details; and
   predicting a future error associated with the memory module based on the error and the error event details and the cause for the error, wherein the error event details are utilized for predicting the future error without relying upon a state of the computing device.

17. The non-transitory computer readable storage medium of claim 16, wherein the controller comprises a Baseboard Management Controller (BMC) connected to the microprocessor; and the instructions are configured at least in part in a Basic Input/Output System (BIOS) of the computing device.

18. The non-transitory computer readable storage medium of claim 17, wherein when executed by the microprocessor, the method performed by the computing device further comprises:
   storing the second data into a predefined region of a memory module.

19. The non-transitory computer readable storage medium of claim 18, wherein the predefined region in the memory module is configured to implement Serial Presence Detect (SPD); the second data includes a portion retrieved from the memory module; and the instructions are executed prior to restarting of the computing device as a result of the hardware error in the memory module.

* * * * *